DEVICE FOR VARIABLE AMPLITUDE CORRECTION

Filed May 15, 1956

INVENTOR
KONRAD JAKOB WILHELM GEIGER
JOHANNES HENDRIK WESSELS
BY Fred M. Vogel
AGENT

United States Patent Office 2,920,194

Patented Jan. 5, 1960

2,920,194

DEVICE FOR VARIABLE AMPLITUDE CORRECTION

Konrad Jakob Wilhelm Geiger, Zurich, Switzerland, and Johannes Hendrik Wessels, Eindhoven, Netherlands, assignors, by mesne assignments, to North American Philips Company, Inc., New York, N.Y., a corporation of Delaware Application May 15, 1956, Serial No. 585,006

Claims priority, application Netherlands May 17, 1955

4 Claims. (Cl. 250—27)

This invention relates to devices for variable amplitude correction of a signal, more particularly for correcting the distortion of a television signal, resulting from the finite cross section of the scanning beam in a television camera. It is already known that such correction may be effected by superposing echoes on the signal. It may be deduced theoretically that, if negative echoes having equal amplitudes A and leading or lagging with respect to the initial signal during a period T are added to the signal, this corresponds to multiplication of the transmission characteristic by a factor $1-2A \cos \omega T$ wherein $\omega$ represents the angular frequency of the signal components. From the formula it appears that high frequencies, for which still applies that $\omega T$ is smaller than $\pi$, are amplified to a greater extent than lower frequencies, whereas the phase of the various components is not varied.

A device of this kind is already known, in which use is made of a delay line, for example an artificial line, of which one end is open and the other end is terminated to be free from reflection. The signal to be corrected is supplied to the last-mentioned end, an output voltage being derived by combining the voltages across the two ends of the delay line in a suitable manner with opposite polarities. The known device is furthermore of a design such that, when the strength of the echoes supplied varies, the amplification of the low frequencies, which determine the level of the television signal, remains constant. The latter requires the use of an output circuit, which in practice has not particularly favourable properties.

The invention provides a simple solution of the problem, whereby the proportioning of the various component parts is not critical. In the device according to the invention the signal to be corrected is supplied with opposite polarity and variable amplitude ratio to an open end and an end terminated to be free from reflection, of a delay line, the output signal being derived from the last-mentioned end.

In order that the invention may be readily carried into effect, one embodiment will now be described, by way of example, with reference to the accompanying drawing, in which.

Figure 2:
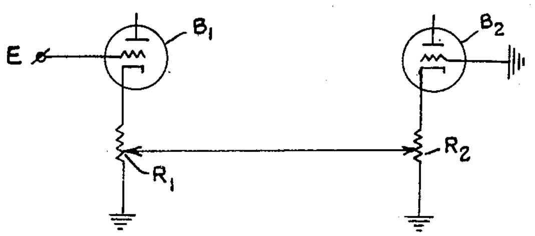
Fig. 2 illustrates a modification of Fig. 1.
Figure 1:
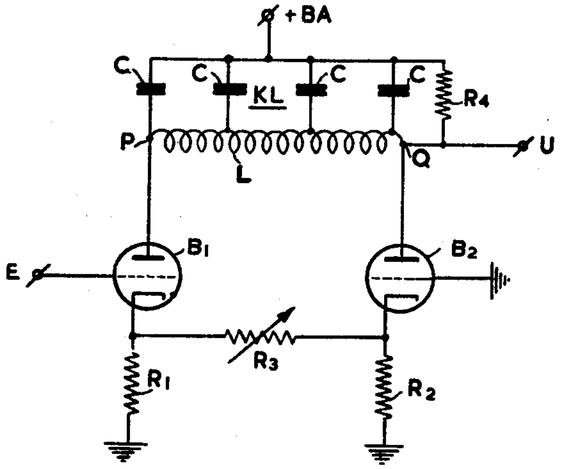
Fig. 1 is a schematic diagram of a preferred embodiment of the invention.

The signal to be corrected is supplied via an input terminal E to the control grid of an amplifying tube B1, of which the cathode is connected to earth via a resistor R1 and is coupled via a variable resistor R3 to the cathode of an amplifying tube B2, of which the cathode is connected to earth via a resistor R2 and of which the control grid is connected to earth directly. The anode of tube B1 is connected to the open end P of an artificial line KL, which is designed in known manner and which comprises, for example, an inductance L, which has a plurality of tappings and which is connected via a plurality of capacitors C to the positive terminal BA of a battery (not shown), the negative terminal of which is connected to earth. The other end Q of the artificial line KL is terminated to be free from reflection by means of a resistor R4 and is connected to the anode of tube B2 and the output terminal U, from which the corrected signal is derived.

This circuit operates as follows:

Tube B1 transmits the input signal from the input terminal E of negative polarity to the end P of the artificial line KL, which transmits this signal with a delay time T to the end Q, which is closed by resistor R4 to be free from reflection. The signal supplied to the input terminal is furthermore transmitted via the cathode of tube B1 and resistor R3 to the cathode of tube B2, producing there a control voltage for this tube, so that in the anode circuit of tube B2 a voltage is produced at point Q, which is synchronous with the input signal and has the same polarity. This voltage constitutes the leading echo of the corrected signal. The artificial line KL transmits this voltage in the form of a wave traveling towards the open end P, which wave reaches this end after a delay time T and is reflected there completely whilst retaining the same polarity, so that after a delay time 2T a second echo appears at point Q, of which the amplitude is at least substantially equal to that of the first echo and of which the polarity is equal to that of the input signal and hence equal to that of the leading echo. The strength of the echoes may be varied by varying the resistor R3. If for example, the value of resistor R3 is infinite, echoes do not occur and at point Q there appears only the voltage which is transmitted via the anode circuit of tube B1 and the artificial line KL. According as resistor R3 has a smaller value, the strength of the echoes at point Q is greater, but even when the cathodes of the tubes B1 and B2 are shortcircuited, the strength of the echoes cannot fundamentally exceed that of the main signal, which is supplied via the anode of tube B1. As previously mentioned, the addition of echoes corresponds to the multiplication of the transmission characteristic by a factor $1-2A \cos \omega T$. From the formula it appears that a proportionality factor $1-2A$ would occur for low frequencies, for which there applies that $\cos \omega T$ is substantially equal to 1, if the main signal were transmitted with the same strength. However, in the described circuit, the amplification of tube B1 is dependent upon the value of resistor R3. When the value of resistor R3 decreases, the current feedback coupling of tube B1 decreases as a result of the decreased effective cathode resistance, so that the amplification of tube B1 becomes stronger. At the same time, the strength of the echoes increases. If the product of the mutual conductance S1 of tube B1 and resistor R1 is equal to the product of the mutual conductance S2 of tube B2 and resistor R2, the transmission of low frequencies from point E to point U is independent of the value of resistor R3, at least if the anode reaction of the tubes B1 and B2 is negligible. This may be realised as follows: If the anode currents of the tubes B1 and B2 are assumed to be $Ia1$ and $Ia2$, then for low frequencies, for which the transit-time of the artificial line is negligible, the sum of $Ia1$ and $Ia2$ must be constant, that is to say independent of resistor R3. For the variations of $Ia1$, $Ia2$ and the current 13 through resistor R3, when the input signal and the variation of R3 are constant, then usually applies:

$$\Delta Ia1 = -S1\ R1\ (\Delta Ia1 - \Delta I3)$$
$$\Delta Ia2 = -S2\ R2\ (\Delta Ia2 + \Delta I3)$$

Considering the fact that $\Delta Ia1 + \Delta Ia2 = 0$, it immediately follows therefrom that S1 R1 must be equal to S2 R2.

The same effect may be obtained, if instead of connecting a variable resistor between the cathodes of the tubes B1 and B2, the resistors R1 and R2 are made in the form of potentiometers, the tappings of which are connected together and made variable in a corresponding way, as shown in Fig. 2.

What is claimed is:

1. A signal correction circuit comprising a delay line having an open end and an end terminated to be free from reflections, a source of a signal, means connected to apply said signal with a given polarity across said open end of the delay line, means connected to substantially simultaneously apply said signal across said terminated end of the delay line with a polarity opposite to said given polarity, and means connected to derive an output signal from across said terminated end of the delay line, whereby said output signal comprises a delayed component following a leading component by an amount of time dependent on the delay characteristic of said delay line and having an amplitude dependent on the relative amplitude of the signals applied to said ends of the delay line.

2. A signal correction circuit comprising first and second discharge tubes each having at least a cathode, a control grid and an anode, two cathode resistors respectively connected at ends thereof to said cathodes, a delay line having an open end connected to the anode of said first tube and having an end terminated to be free from reflections connected to the anode of said second tube, a source of operating voltage connected between said delay line and the remaining ends of said resistors, a source of signals connected to the grid of said first tube, means connected to bias the grid of said second tube, variable resistance means connected between said cathodes, and means connected to derive an output signal from said terminated end of the delay line, whereby said output signal comprises a delayed component following a leading component by an amount of time dependent on the delay characteristic of said delay line and having an amplitude dependent on the adjustment of said variable resistance means.

3. A circuit as claimed in claim 2, in which said variable resistance means comprises a variable resistor connected between said cathodes.

4. A circuit as claimed in claim 2, in which said variable resistance means comprises a pair of adjustable taps positioned respectively on said cathode resistors, and means electrically interconnecting said adjustable taps.

References Cited in the file of this patent

UNITED STATES PATENTS

| | | |
|---|---|---|
| 2,263,376 | Blumlein et al. | Nov. 18, 1941 |
| 2,465,840 | Blumlein | Mar. 29, 1944 |
| 2,476,900 | Olson | July 19, 1949 |
| 2,542,066 | Varela | Feb. 20, 1951 |

FOREIGN PATENTS

| | | |
|---|---|---|
| 529,044 | Great Britain | Nov. 13, 1940 |

OTHER REFERENCES

Proceedings, Inst. of Radio Engrs., Ginzton et al., "Distributed Amplification," August 1948, vol. 36, No. 8, pages 956–969 part. Fig. 2, page 957.